United States Patent
Hill et al.

(10) Patent No.: US 6,421,427 B1
(45) Date of Patent: Jul. 16, 2002

(54) INTERACTIVE VOICE RESPONSE DATA TRANSFER SYSTEM AND METHOD

(75) Inventors: James Arthur Hill, Shakopee, MN (US); James Edwin Reaves; Matthew Charles Jackson, both of Raleigh, NC (US); William K. Choi, San Jose, CA (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 08/950,481

(22) Filed: Oct. 15, 1997

(51) Int. Cl.[7] .................... H04M 1/64; H04M 3/42; H04M 3/00

(52) U.S. Cl. .................. 379/88.14; 379/88.12; 379/88.16; 379/93.12; 379/142.14; 379/201.07; 379/207.15; 379/211.02; 379/212.01; 379/265.09; 379/902

(58) Field of Search .............. 379/67.1, 68, 88.01, 379/88.14, 88.17, 88.18, 91.01, 93.02, 93.15, 100.12, 209, 210, 258, 265, 88.1, 88.11, 88.12, 88.16, 93.08, 93.09, 100.13, 142.04, 142.06, 142.07, 142.14, 201.01, 201.04, 201.06, 201.07, 207.18, 207.16, 211.02, 212.01, 265.01, 265.09, 265.11, 281, 308, 309, 913, 902

(56) References Cited

U.S. PATENT DOCUMENTS

| | | | | |
|---|---|---|---|---|
| 5,469,504 A | * | 11/1995 | Blaha | 379/265 |
| 5,625,678 A | * | 4/1997 | Blomfield-Brown | 379/93 |
| 5,703,943 A | * | 12/1997 | Otto | 379/265 |
| 5,742,596 A | * | 4/1998 | Baratz et al. | 370/351 |
| 5,757,904 A | * | 5/1998 | Anderson | 379/265 |
| 5,771,276 A | * | 6/1998 | Wolf | 379/88 |
| 5,901,203 A | * | 5/1999 | Morganstein et al. | 379/88.02 |
| 5,995,615 A | * | 11/1999 | Miloslavsky | 379/265 |
| 6,046,762 A | * | 4/2000 | Sonesh et al. | 379/265 |
| 6,047,054 A | * | 4/2000 | Bayless et al. | 379/202 |
| 6,081,591 A | * | 6/2000 | Skoog | 379/220 |
| 6,094,479 A | * | 7/2000 | Lindeberg et al. | 379/220 |

* cited by examiner

Primary Examiner—Allan Hoosain
(74) Attorney, Agent, or Firm—Schwegman, Lundberg, Woessner & Kluth P.A.

(57) ABSTRACT

An interactive voice response (IVR) system collects data associated with a telephone call, and provides the data to a server. The server transforms the data into a format consistent with a different telephony platform specification implemented by clients attached to the server such that the data can be retrieved by any client to which a telephone call is transferred. Data is also shared between remote servers when calls are transferred. The servers each broadcast their identity when initially connected to a wide area network. In response, each server on the network responds with their identify. Each server updates a table of servers in accordance with the messages exchanged.

20 Claims, 5 Drawing Sheets

INTERACTIVE VOICE RESPONSE DATA TRANSFER SYSTEM AND METHOD

FIELD OF THE INVENTION

The present invention relates to interactive voice response systems, and in particular to transfer of collected data with a call.

BACKGROUND OF THE INVENTION

Interactive voice response (IVR) systems collect data in conjunction with a telephone call. The data may include information such as an account number or social security number. This data may be used to retrieve information from a server related to the caller. The IVR is usually implemented on a client system which is coupled to the server. A telephone switch, PBX, is also coupled to the server, and controls telephone connections. Data is formatted and transferred between the server and the client in conformance with one of several exclusive platform specifications, Telephony Services Application Programming Interface (TSAPI) by Novell and AT&T, Telephony Application Programming Interface (TAPI) by Microsoft Corp. or other proprietary platforms. A different driver is used for each specification because of differences in the formatting of the data exchanged. As such, only one type of specification is usually implemented on a system comprising a server with multiple clients.

When a call is to be transferred to a real person, or independent software vendor ISV program residing on a different client, it is desirable to have the underlying data which has been collected transferred to a client which is associated with the person so that the person can immediately see the data associated with the caller without asking for it again. This increases efficiency of handling telephone calls, and is also more convenient for the caller because the caller does not have to repeat the information provided. By providing the data on the server, each client receiving a transferred call can retrieve the data associated with that call directly from the server.

Currently, each IVR system must be designed exclusively to implement one of the platform specifications. The specifications also require operating environments, such as Windows, Netware or UNIX, and also require additional telephony software which must be licensed. Since there are at least two separate specifications, each IVR system must be designed and coded for the different, exclusive specifications, leading to greatly increased development and maintenance costs. Further, the specifications do not provide any means to transfer data to different sites, such as between two different servers. IVR systems must be paired one to one with servers, and calls handled by a server at one site cannot be synchronized with a server at a second site. There is a need to transfer calls between servers to balance workload. There is a further need to be able to design and maintain a single IVR system which can operate with systems implementing either specification.

SUMMARY OF THE INVENTION

An interactive voice response (IVR) system collects data associated with a telephone call, and provides the data to a server. The server transforms the data into a format consistent with a telephony platform specification implemented by clients attached to the server such that the data can be retrieved by any client to which a telephone call is transferred. No modifications are required to the clients in order for them to retrieve the data.

Data is also shared between remote servers when calls are transferred. The servers each broadcast their identity when initially connected to a wide area network. In response, each server on the network responds with their identity. Each server updates a table of servers in accordance with the messages exchanged.

DESCRIPTION OF THE EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present invention. The following detailed description is, therefore, not to be taken in a limiting sense, and the scope of the present invention is defined by the appended claims.

Numbering in the Figures is usually done with the hundreds and thousands digits corresponding to the figure number, with the exception that the same components may appear in multiple figures.

Figure 1:
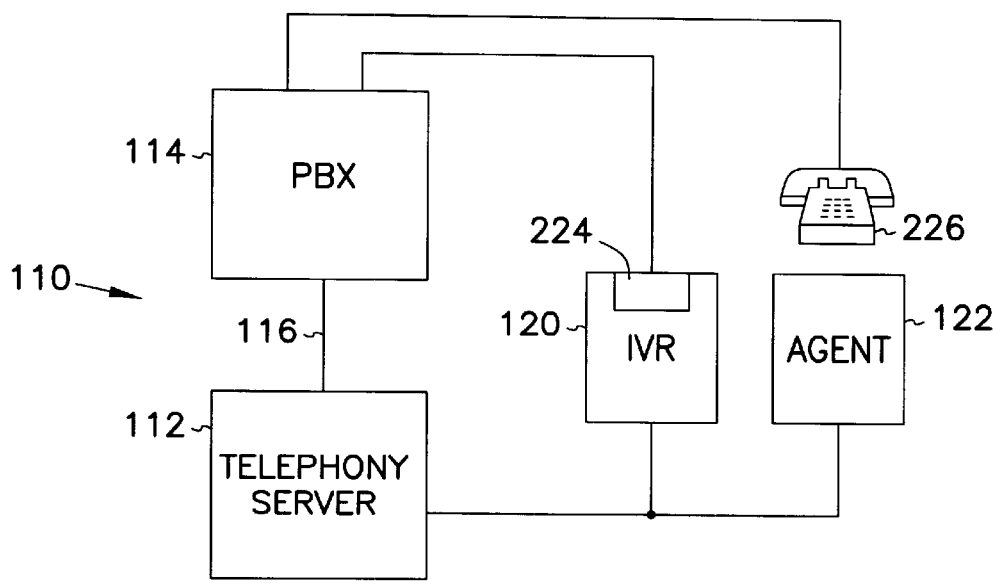
FIG. 1 is a block diagram of an interactive voice response system.

An interactive voice response system is shown generally at 110 in FIG. 1. The system comprises a server 112 coupled to a telephone switch 114, such as a private branch exchange (PBX) switch having an interface into the server indicated at 116 enabling the server and the switch to communicate information identifying telephone connections in a known manner. In one embodiment, the switch comprises a Nortel Merridian 1 switch. The server 112 is also networked to personal computers indicated at 120 and 122. The network can be one of many commercially available networks, such as ethernet, with higher level network software comprising Novell Netware or Microsoft NT for example. The personal computers are represented in block format for convenience, and comprise industry standard computers including a processor, random access memory (RAM), secondary storage devices such as disk drives, CD Rom and diskettes. In addition, they contain network cards to allow connection to the server 112 via the network. Server 112 may also be a standard personal computer, but usually has more secondary storage and RAM to enable it to store large amounts of data for the personal computers attached to it. Both the server 112 and computers 120 and 122 store software and run it on processors from RAM. Server 112 in addition, has a driver module or set of modules which implement one of several exclusive platform specifications. Telephony Services Application Programming Interface (TSAPI) by Novell and AT&T, Telephony Application Programming Interface (TAPI) by Microsoft Corp. or another proprietary platform is accommodated in the driver to enable it to communicate directly with computers 120 and 122 which also implement the platform specifications. The driver, or software operating in conjunction with the driver has been modified however to allow computer 120 to send data outside of the platform specification implemented by the driver.

In one embodiment, computer 120 comprises an interactive voice response (IVR) system which may be a stand alone device which answers incoming calls as represented by the block 224, collects caller or user inputs and sends user information to the server 112. In prior systems, computer 120 would have to implement the same platform specifications in order to send data to the server 112. In the present invention, the device driver in the server comprises further code translation or transformation modules that interface directly with the computer 120 via the network connection to receive data in any agreed upon format, and then translate the data into the format required by the platform implemented by the driver. The translated or transformed data is then placed in the proper area of RAM in server 112 as though it were received by an IVR system implementing the proper platform.

When a user wishes to speak to an agent, the agent is using a computer running an application which can present information to the agent regarding the telephone call, such as computer 122. The voice portion of the call is routed by switch 114 to a telephone 226 associated with the agent computer 122. Computer 122 also implements the same platform specification as the driver on server 112 so that it can retrieve the data from the server associated with the call. Since the data is stored in the proper format in accordance with the platform specification, it is easily viewed by the agent. There may be multiple agents coupled to the network, each working on a computer which implements the platform specification consistent with the driver.

Figure 2:
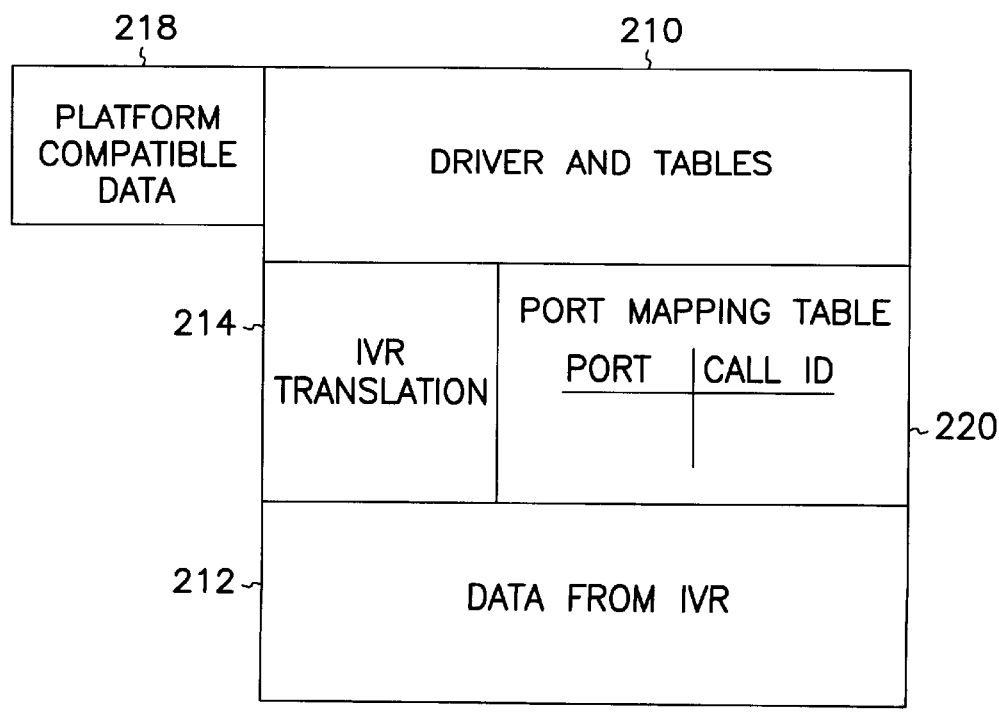
FIG. 2 is a block diagram of programming code running on a server of the interactive voice response system of FIG. 1.

Further detail of the programming code structure running on server 112 is shown in block diagram form in FIG. 2. As previously stated, such programming code is executed by a processor in server 112 out of RAM. The blocks in FIG. 2 may be loosely thought of as portions of the RAM, however, it is understood by those skilled in the art that code modules comprising the programming code may be stored anywhere in RAM or similar computer readable medium accessible to the computer system 122, and the functions may be distributed in many different ways within modules without departing from the invention. A driver as initially described above is shown at 210, along with a block indicating data or information 212 received from an IVR such as IVR 120. The information undergoes a transformation at 214 into data 218 which is compatible with the platform specification implemented by driver 210. A cross reference table, identified as port mapping table 220 is used to map ports with call IDs received from PBX 114. This is used to ensure that data is correctly associated with a call being transferred.

Figure 3:
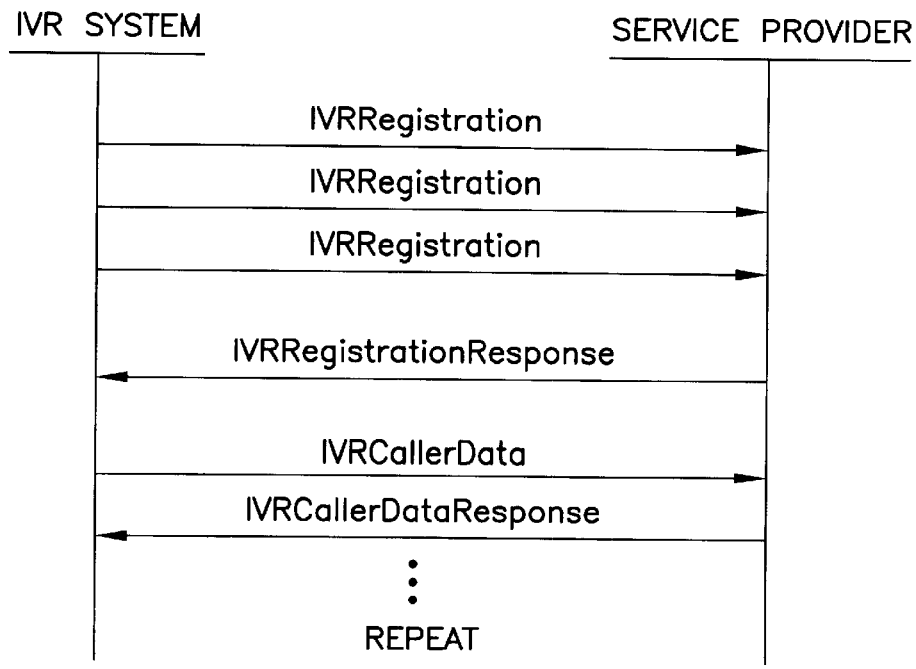
FIG. 3 is a message flow diagram of IVR registration performed by portions of the programming code of FIG. 1.
Figure 4:
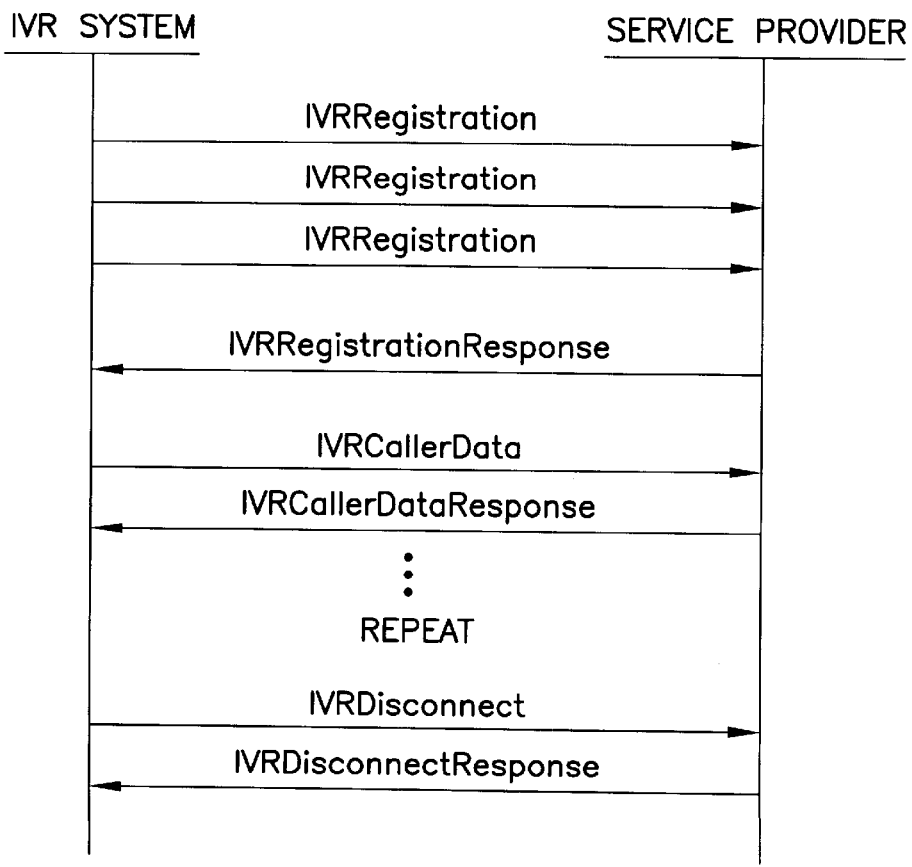
FIG. 4 is a message flow diagram of IVR initiating disconnect performed by portions of the programming code of FIG. 1.
Figure 5:
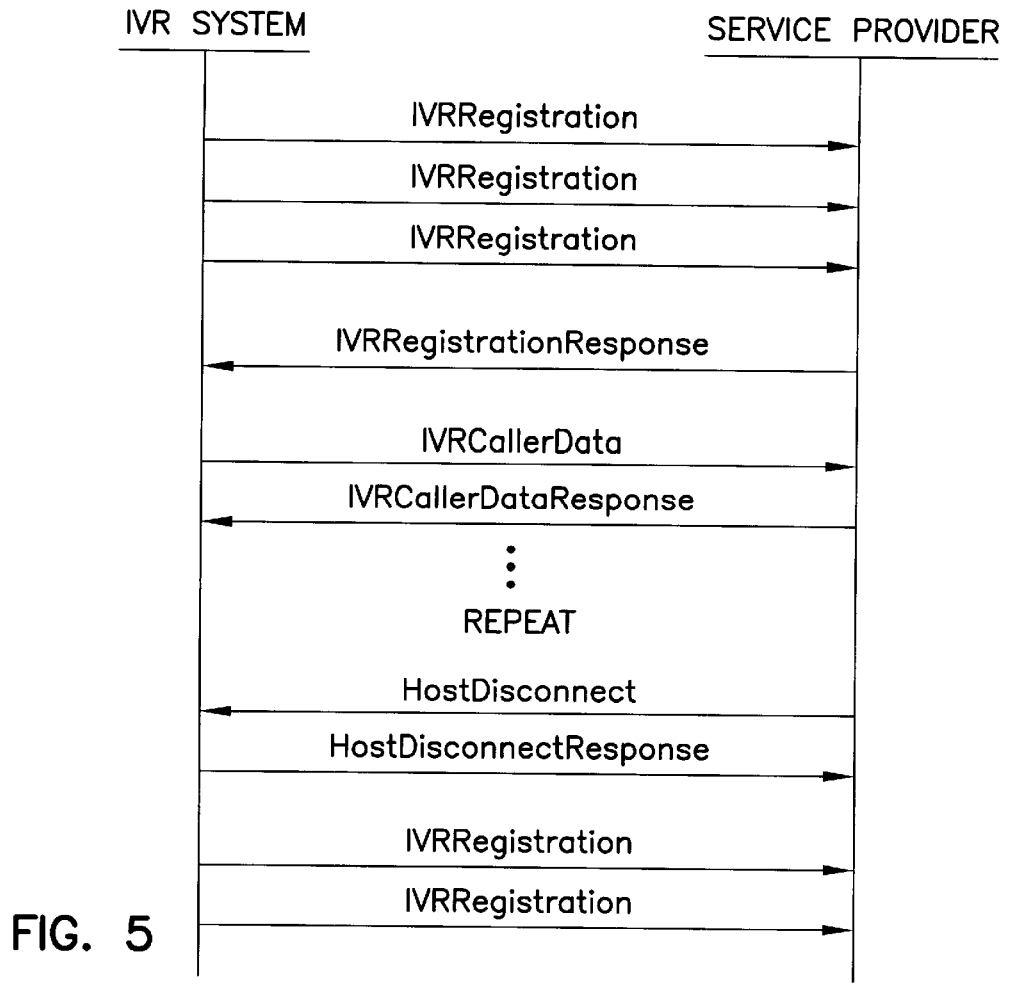
FIG. 5 is a message flow diagram of the server of FIG. 2 initiating disconnect.

There are several types of messages that flow between the IVR and the server to manage communication between the two and to transfer data between them as shown in FIGS. 3, 4, 5 and 6. An IVR Registration message is sent to the server to register it with the server. The message is sent until a response is received as seen in FIG. 3. An IVR Association ID is populated in an IVRRegistrationResponse message. Port numbers may also be exchanged. An IVRDisconnect message is used as seen in FIG. 4 to disconnect the IVR from the server. It closes a TCP/IP connection in one embodiment after a configured amount of time following receipt of the message. Similarly, a HostDisconnect message disconnects the server from an IVR module or program implementing a script on computer 120. This generally occurs when the IVR capabilities are no longer available for a variety of reasons. Whenever it is brought down, the IVR system enters a state of not registered and must re-register before sending any IVRCallerData messages.

An IVRCallerData message attaches IVR caller data which has been gathered in accordance with an IVR script to which the caller has responded. The IVR module provides this to the server, and in response, the server sends an IVRCallerDataResponse message. The IVRCallerData message includes the IVR caller data and a port number or DN of the line on which the call currently exists, or an appropriate PBX Call ID depending on whether the IVR is operating in a standalone mode or an integrated mode.

Figure 6:
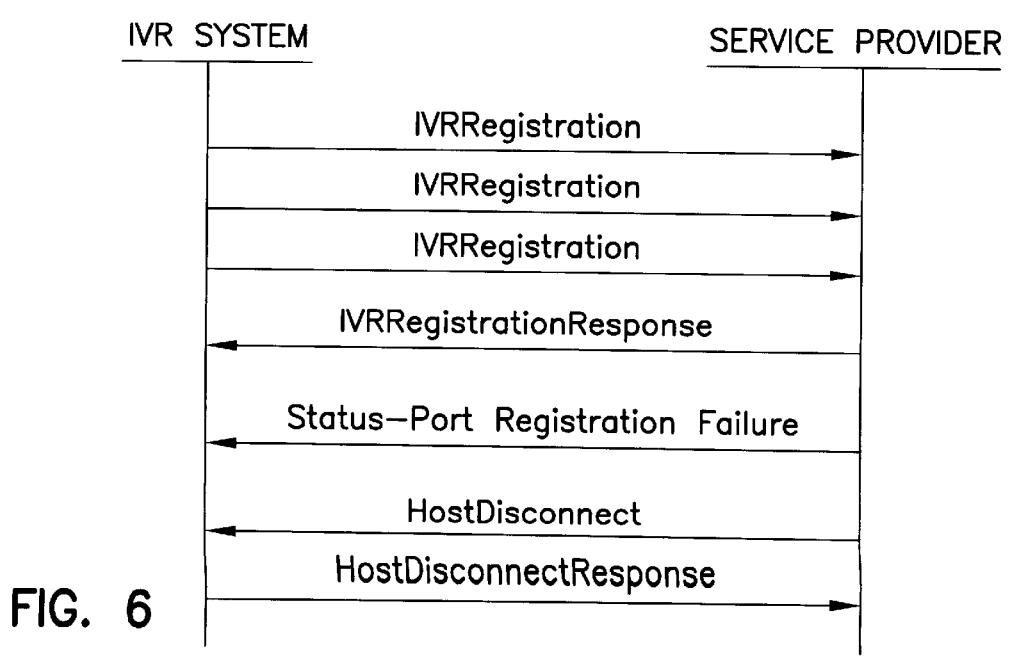
FIG. 6 is a message flow diagram of the server of FIG. 2 sending a Status message.

A Status message is sent from the server to the IVR module as an unsolicited status message (USM) as seen in FIG. 6. When the IVR is operating in standalone mode, the message indicates that a port number or DN listed in the IVRRegistration message could not be monitored due to some failure. Attempts to register should not be repeated until an error condition is corrected. Acknowledgments are used to indicate receipt of all data sent from the IVR module to the server.

Servers should be brought up in a state of waiting for IVR systems to register. IVR systems should always be brought up in a state of attempting to register. Either may initiate a disconnect.

The IVRCallerData message comprises a message header, a network call id, an origination address and the user data. The format of the message header in one embodiment comprises 10 octets. The first octet is a message identifier. The second is a message header length. The third and fourth octets identify the length of the message in octets. Valid values comprise hexadecimal 000A-FFFF. The fifth octet comprises the Association ID. When used in the IVRRegistration message, the Association ID field contains a 0. In the corresponding IVRRegistrationResponse message, the Association ID field contains a value that the IVR driver assigned to represent the association that has been set up between the IVR module in computer 120 and the IVR driver. All subsequent messages use the assigned value in this field. Octets 6 and 7 of the message header contain a flag bit to indicate whether the message is a request or a response. Also, a message reference id is contained in these two octets of the header. The message reference id is a parameter used in both sent and received messages. It is used to associate request events with response events. When an application sends a message request, it assigns a value to the reference id parameter. When a response message corresponding to that request is received, it contains the same reference id as in the request. Using the reference id parameter assists in pairing up requests to responses, especially when several requests of the same type are outstanding. Octets 8 and 9 describe the message type, with values 0201 corresponding to IVRCallerData messages and 0202 corresponding to IVRCallerDataResponse messages. CallerInfoData messages are identified by the value 0301. Any values may be selected for the remaining messages by one skilled in the art. Octet 10 is reserved.

The network call id field comprises 6 octets. Octet 1 is a network call id identifier. Octet 2 describes the length of the network call id. 3 and 4 define a home location code, and octets 5 and 6 are the actual network call id. The network call information can be used by an application to track a call that was rerouted through the network using network automatic call distribution (ACD) routing tables. The network call information can be used to uniquely identify a call and allow it to be transferred.

The origination address field comprises a variable number of octets. The first octet is the origination address, the second is the length of the origination address. The third is reserved, and the fourth identifies the origination type, with the values 00 being unknown, 01 referring to a port number, and 02 referring to a DN. Octet 5 is the beginning of address digits comprising a character string of a maximum of 33 octets.

The user data field comprises up to 516 octets or bytes. The first byte comprises a user data identifier, the second and third comprise the length of the user data, and the fourth defines a data type, such as block, list, reserved, and customer definable. Bytes 5 through 516 comprise the actual caller or user data to be transferred.

The CallerInfoData message format comprises a message header, a network call id and user data, each of which has been described above with respect to the IVRCallerData message.

Figure 7:
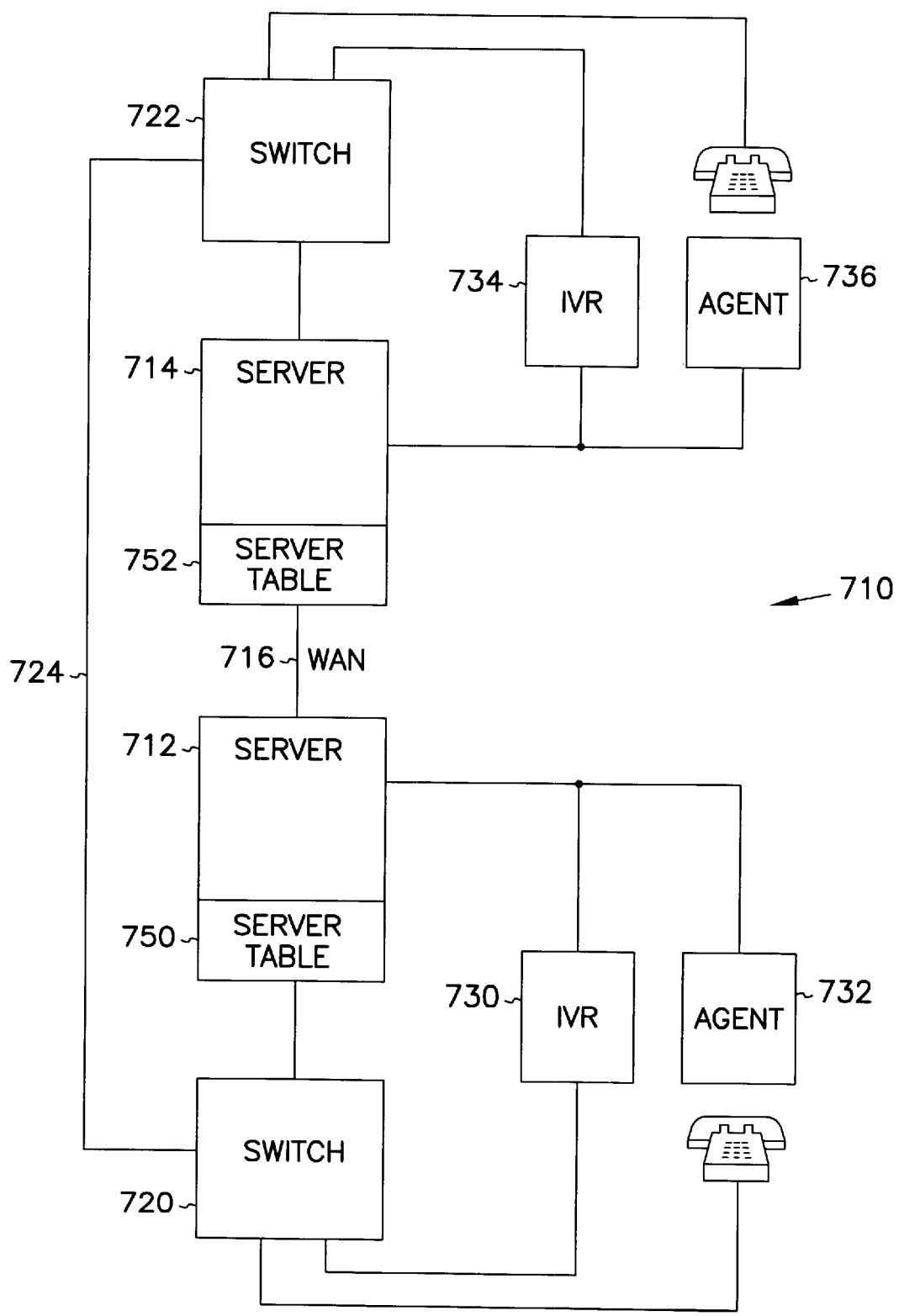
FIG. 7 is a block diagram of a network of remote servers forming a distributed interactive voice response system.

In FIG. 7, a distributed server environment is shown generally at 710. Two servers 712 and 714 are coupled via a wide area network indicated at 716. The servers are each configured similarly to those in FIG. 1, being coupled to switches 720 and 722 respectively. The switches are coupled via a communication network 724 which may be the same physical network as wide area network 716, but operating under a different protocol in one embodiment such as a switched network. Each of the servers is coupled to an IVR and multiple agents as represented at 730, 732, 734 and 736. Further, telephone connections are represented by telephones 740, 742, 744 and 746. Each server also comprises a server table indicated at 750 and 752. It should be noted that while only two servers are shown, there may be many servers coupled to each other in the same manner. Switches uniquely track calls from switch to switch by use of the Network ACD. By use of the server tables in the servers, and the information contained in the messages that are transferred between each server and directly attached IVRs, calls may be transferred between servers to agents attached to the servers, and the data associated with the call is also transferred with the call regardless of the platform implemented on the servers. In this manner, much higher connectivity is achieved, and collected data from one site is preserved. Further, and IVR system need only be deployed at one site, making database updating and client or caller management much more simple. Agents can transfer calls to other sites for more specialized customer attention, and further, sites can mix and match between platform specifications.

Figure 8:
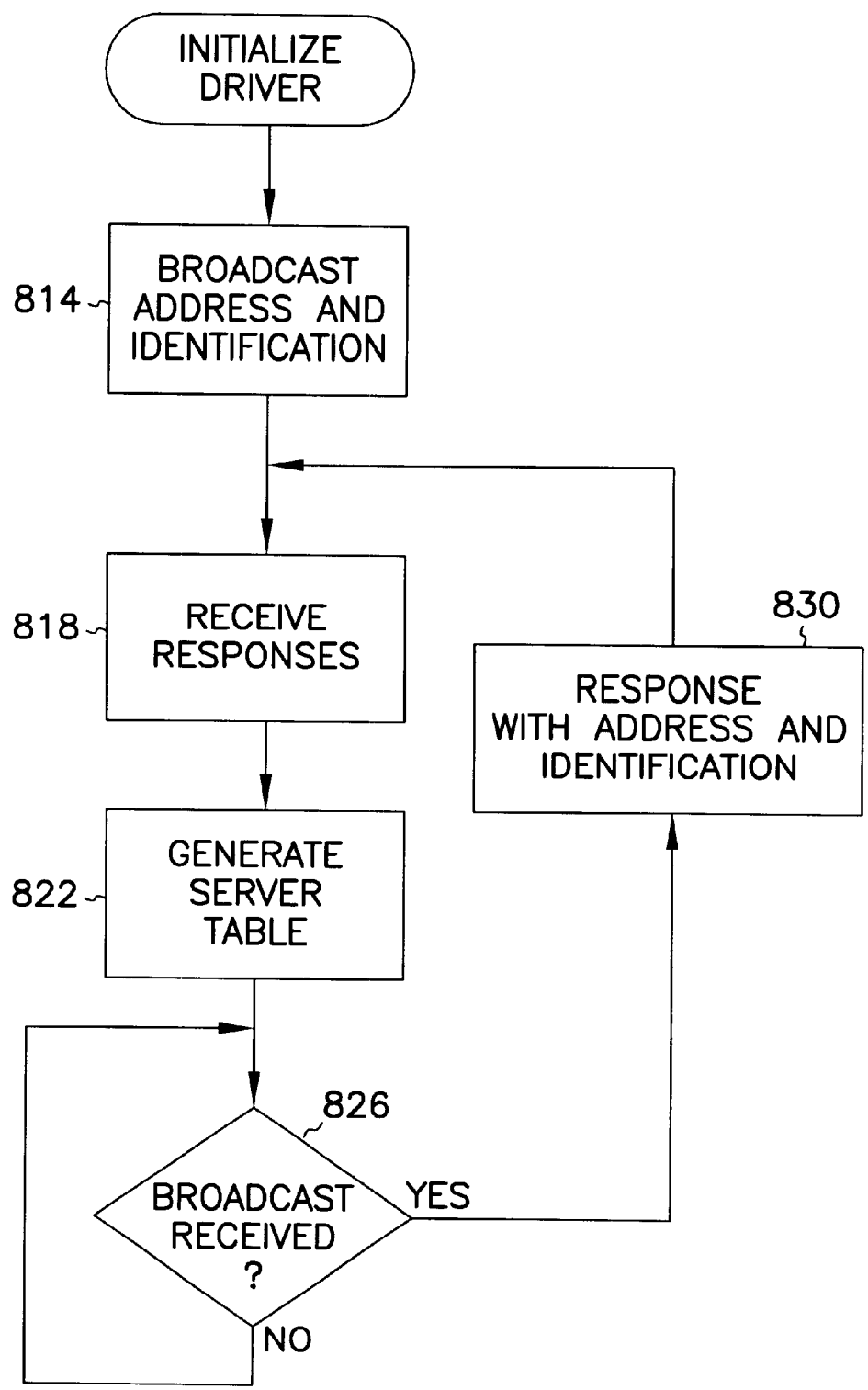
FIG. 8 is a flow diagram showing establishment of a table identifying the remote servers of FIG. 7.

The steps involved in generation of the server tables is shown in the flow diagram of FIG. 8. When the IVR driver is initialized at 810, either as part of selection of an application on the server, or via an automatic startup upon the server being powered up, an address of the server and an identification of the server is broadcast via the network, such as by a UDP message at 814 over a predetermined socket. The driver listens over the socket and receives responses at 818 and generates a server table at 822. It then waits to see if it receives a broadcast message from another server which may have been just initialized at 826. If it does not receive one, it continues to wait by looping back. An interrupt mechanism or polling operation may be used as desired. If such a broadcast is received at 826, the driver responds at 830 with its address and identifier, and then recompiles the server table based on all the other broadcast messages received at 818 and 822.

It is to be understood that the above description is intended to be illustrative, and not restrictive. Many other embodiments will be apparent to those of skill in the art upon reviewing the above description. For instance, the particular order and arrangement of modules and the code in which they are written may be easily varied. In addition, the protocols of the messages and the types of networks used may also be varied without departing from the scope and spirit of the invention. The scope of the invention should, therefore, be determined with reference to the appended claims, along with the full scope of equivalents to which such claims are entitled.

What is claimed is:

1. An interactive voice response system, comprising:
    an agent which implements a first exclusive platform telephony specification for exchange of data;
    an interactive voice response module which implements a second exclusive platform telephony specification not compatible with the first exclusive platform telephony specification and collects user data in association with a telephone call; and
    a first server having a driver which selectively interfaces with either the first or second exclusive platform telephony specifications and also having the ability to receive data from the interactive voice response module and transform data received in the second exclusive platform telephony specification to a format compatible with the first exclusive platform telephony specification.

2. The interactive voice response system of claim 1 and further comprising a second server remote from the first server.

3. The interactive voice response system of claim 2 wherein the first and second servers exchange messages to generate a server table.

4. The interactive voice response system of claim 3 wherein the first and second servers broadcast a unique address and identifier upon initialization and respond to receive such broadcasts with their unique address and identifier.

5. The interactive voice response system of claim 4 wherein each server generates a server table from such received broadcasts.

6. The interactive voice response system of claim 5 wherein the broadcasts are sent over a predetermined socket.

7. An interactive voice response system, comprising:
    an agent which implements a first exclusive platform telephony specification for exchange of data;
    an interactive voice response module which implements a second exclusive platform telephony specification not compatible with the first exclusive platform telephony specification and collects user data in association with a telephone call;
    a switch for associating telephone calls with the agent and the interactive voice response module; and
    a first server having a driver which interfaces with the first or second exclusive platform telephony specifications and also having the ability to receive data from the interactive voice response module and selectively transform data received in the second exclusive platform telephony specification to a format compatible with the first exclusive platform telephony specification.

8. The interactive voice response system of claim 7 and further comprising a second server remote from the first server.

9. The interactive voice response system of claim 8 wherein the first and second servers exchange messages to generate a server table.

10. The interactive voice response system of claim 9 wherein the first and second servers broadcast a unique address and identifier upon initialization and respond to receive such broadcasts with their unique address and identifier.

11. The interactive voice response system of claim 10 wherein each server generates a server table from such received broadcasts.

12. The interactive voice response system of claim 11 wherein the broadcasts are sent over a predetermined socket.

13. A driver module for a server in an interactive voice response system, comprising:
- a module for exchanging data with all agent which implements a first exclusive platform telephony specification;
- a module for receiving user data collected by an interactive voice response application in association with a telephone call, wherein the voice response application provides the data consistent with a different exclusive platform telephony specification; and
- a translation module that selectively translates the data collected from either the first or second exclusive platform telephony specifications to a format consistent with the first exclusive platform telephony specification.

14. A method of exchanging data between an agent and an interactive voice response device which both implement different telephony exclusive platform specifications for data exchange, the method comprising the steps of:
- receiving user data collected by the interactive voice response device in association with a telephone call, wherein the voice response device provides the data compatible with a first exclusive platform telephony specification;
- selectively translating the data collected from either the first or second exclusive platform telephony specifications to a format consistent with a second exclusive platform telephony specification implemented by the agent; and
- transferring the translated data to the agent.

15. The method of claim 14 and further comprising transferring the call to a telephone associated with the agent such that the call and corresponding data are available to the agent.

16. The method of claim 14 wherein the steps are performed by a server, the server further performing the step comprising broadcasting a unique address and identifier upon initialization of the server.

17. The method of claim 16 wherein the server performs the additional steps of receiving broadcasts from other servers and responding to such broadcasts with its unique address and identifier.

18. The method of claim 17 wherein the server performs the additional step of generating a server table from broadcasts of unique addresses and identifiers from other servers.

19. A computer readable medium containing program code to cause a suitably configured computer system to perform the following steps:
- receive user data collected by an interactive voice response device in association with a telephone call, wherein the voice response device provides the data compatible with a first exclusive platform telephony specification;
- selectively translate the data collected from either the first or second exclusive platform telephony specifications to a format consistent with a second exclusive platform telephony specification implemented by an agent; and
- transfer the translated data to the agent in conformance with the second exclusive platform telephony specification.

20. The computer readable medium of claim 19, wherein the medium contains further program code to cause the suitably configured computer system to perform the additional steps of:
- broadcasting a unique address and identifier upon initialization of the program code;
- receiving broadcasts from other servers and responding to such broadcasts with its unique address and identifier; and
- generating a server table from received broadcasts of unique addresses and identifiers.

* * * * *

UNITED STATES PATENT AND TRADEMARK OFFICE
CERTIFICATE OF CORRECTION

PATENT NO. : 6,421,427 B1
DATED : July 16, 2002
INVENTOR(S) : Hill et al.

It is certified that error appears in the above-identified patent and that said Letters Patent is hereby corrected as shown below:

<u>Column 7,</u>
Line 19, delete "all" and insert -- an --, therefor.

Signed and Sealed this

Twenty-eighth Day of January, 2003

JAMES E. ROGAN
*Director of the United States Patent and Trademark Office*